(12) United States Patent (10) Patent No.: US 8,893,426 B2
Jaeger (45) Date of Patent: Nov. 25, 2014

(54) APPARATUS AND METHOD FOR USING WATERFOWL DECOYS ON LAND

(75) Inventor: William Jaeger, Orland Park, IL (US)

(73) Assignee: William Jaeger, Orland Park, IL (US)

( * ) Notice: Subject to any disclaimer, the term of this patent is extended or adjusted under 35 U.S.C. 154(b) by 855 days.

(21) Appl. No.: 12/688,266

(22) Filed: Jan. 15, 2010

(65) Prior Publication Data

US 2010/0180486 A1 Jul. 22, 2010

Related U.S. Application Data

(60) Provisional application No. 61/205,515, filed on Jan. 21, 2009.

(51) Int. Cl.
*A01M 31/06* (2006.01)
*A45F 3/44* (2006.01)
(52) U.S. Cl.
CPC . *A01M 31/06* (2013.01); *A45F 3/44* (2013.01)
USPC .................................................................. 43/3
(58) Field of Classification Search
USPC ..................... 43/3, 2; 220/484; 248/530, 533
See application file for complete search history.

(56) References Cited

U.S. PATENT DOCUMENTS

| | | | |
|---|---|---|---|
| 238,112 A * | 2/1881 | Halstead | 175/19 |
| 843,588 A * | 2/1907 | Ditto | 43/3 |
| 2,256,778 A * | 9/1941 | Lundgren | 43/3 |
| 2,536,736 A * | 1/1951 | Gazalski | 43/3 |
| 2,787,074 A * | 4/1957 | Miller | 43/3 |
| 2,791,347 A * | 5/1957 | Boehm | 165/45 |
| 3,736,688 A * | 6/1973 | Caccamo | 43/3 |
| 4,407,505 A * | 10/1983 | Kendziorski | 473/173 |
| 4,611,421 A * | 9/1986 | Jacob | 43/3 |
| 4,665,668 A * | 5/1987 | Serpico | 52/169.2 |
| 5,042,812 A * | 8/1991 | Tillman | 220/484 |
| 5,168,649 A * | 12/1992 | Wright | 43/3 |
| 5,392,554 A * | 2/1995 | Farstad et al. | 43/3 |
| 5,459,958 A * | 10/1995 | Reinke | 43/2 |
| 5,603,401 A * | 2/1997 | Brunner | 220/484 |
| 5,735,430 A * | 4/1998 | Gorman | 220/484 |
| 5,747,687 A * | 5/1998 | Edwards et al. | 220/484 |
| 5,787,632 A * | 8/1998 | Kraut | 43/2 |
| 5,819,463 A * | 10/1998 | Amos | 42/94 |
| 5,862,932 A * | 1/1999 | Walsh et al. | 220/484 |
| 5,881,495 A * | 3/1999 | Clark | 248/530 |

(Continued)

FOREIGN PATENT DOCUMENTS

| | | | | |
|---|---|---|---|---|
| FR | 2646588 A1 * | 11/1990 | ............ | A01M 31/06 |
| GB | 2131266 A * | 6/1984 | ............ | A01M 31/06 |
| GB | 2189124 A * | 10/1987 | ............ | A01M 31/06 |
| GB | 2295953 A * | 6/1996 | ............ | A01M 31/06 |

*Primary Examiner* — Darren W Ark

(57) ABSTRACT

There is disclosed an apparatus and a method for supporting a movable or stationary decoy displayed on a stake for attracting waterfowl where the decoy has a neck portion, a head portion, a body portion, and a stake that protrudes from and may be securely attached to the body portion of the decoy. A tubular receiving member having an internal channel is provided for loosely receiving the stake. The tubular receiving member can be made of black PVC conduit or other suitable materials and has an upper end that is flared to provide an opening that is larger than the internal channel in the tubular receiving member and a lower end that is sealed to prevent water from entering the tubular receiving member. The lower end of the tubular receiving member is adapted to be mounted in the ground.

3 Claims, 4 Drawing Sheets

(56) References Cited

U.S. PATENT DOCUMENTS

| | | | |
|---|---|---|---|
| 5,930,936 A * | 8/1999 | Parr et al. | 43/3 |
| 6,145,528 A * | 11/2000 | Egnew et al. | 43/2 |
| 6,216,998 B1 * | 4/2001 | Butrymowicz et al. | 248/530 |
| 6,374,529 B1 * | 4/2002 | Petroski et al. | 43/3 |
| 6,385,895 B1 * | 5/2002 | Scaries | 43/2 |
| 6,775,943 B2 * | 8/2004 | Loughman | 43/2 |
| 6,786,349 B2 * | 9/2004 | Najd | 220/484 |
| 6,935,065 B1 * | 8/2005 | Oliver | 248/530 |
| 7,264,210 B2 * | 9/2007 | Yu | 248/530 |
| 7,562,487 B2 * | 7/2009 | Barr | 43/2 |
| 7,631,456 B2 * | 12/2009 | Butz | 43/3 |
| 7,694,451 B1 * | 4/2010 | Zink, Jr. | 43/3 |
| 7,827,728 B1 * | 11/2010 | Spafford et al. | 43/2 |
| 8,082,689 B2 * | 12/2011 | Eggleston | 43/3 |
| 8,082,690 B2 * | 12/2011 | Zink, Jr. | 43/3 |
| 8,132,362 B2 * | 3/2012 | King | 47/48.5 |
| 8,230,638 B1 * | 7/2012 | Dunaway | 43/3 |
| 8,316,575 B2 * | 11/2012 | Bradley | 43/2 |
| 8,627,592 B2 * | 1/2014 | Sloop | 43/2 |
| 2004/0169121 A1 * | 9/2004 | Winn | 248/530 |
| 2005/0000967 A1 * | 1/2005 | Najd | 220/484 |
| 2005/0132632 A1 * | 6/2005 | Fisher | 43/3 |
| 2005/0223615 A1 * | 10/2005 | Fencel et al. | 43/3 |
| 2006/0053675 A1 * | 3/2006 | Lindaman | 43/2 |
| 2006/0143969 A1 * | 7/2006 | Lindaman | 43/2 |
| 2006/0143970 A1 * | 7/2006 | Lindaman | 43/3 |
| 2007/0068946 A1 * | 3/2007 | Marshall | 220/484 |
| 2007/0180754 A1 * | 8/2007 | Neeley et al. | 43/3 |
| 2007/0251135 A1 * | 11/2007 | Watlov et al. | 43/3 |
| 2008/0029516 A1 * | 2/2008 | Schmied | 220/484 |
| 2008/0172920 A1 * | 7/2008 | Brint et al. | 43/2 |
| 2008/0184610 A1 * | 8/2008 | Pfeifle | 43/3 |
| 2008/0209792 A1 * | 9/2008 | Watlov | 43/3 |
| 2009/0007479 A1 * | 1/2009 | Jerome, Sr. | 43/2 |
| 2009/0229164 A1 * | 9/2009 | Bradley | 43/2 |
| 2010/0064569 A1 * | 3/2010 | Wyant | 43/2 |
| 2010/0218412 A1 * | 9/2010 | Williams | 43/2 |
| 2011/0146132 A1 * | 6/2011 | Young | 43/3 |
| 2011/0232154 A1 * | 9/2011 | Crank, Jr. | 43/3 |
| 2011/0283591 A1 * | 11/2011 | Sloop | 43/3 |
| 2012/0090217 A1 * | 4/2012 | Young | 43/3 |
| 2012/0180371 A1 * | 7/2012 | Roe | 43/3 |
| 2012/0240447 A1 * | 9/2012 | Gurner, III | 43/3 |
| 2013/0015189 A1 * | 1/2013 | Kanervo | 220/484 |
| 2013/0056607 A1 * | 3/2013 | Mortezazadeh | 248/530 |
| 2014/0082992 A1 * | 3/2014 | Mettler | 43/3 |

* cited by examiner

APPARATUS AND METHOD FOR USING WATERFOWL DECOYS ON LAND

REFERENCE TO RELATED APPLICATION

This patent application claims the benefit of U.S. Provisional Application No. 61/205,515 filed on Jan. 21, 2009, the disclosure of which is incorporated herein by reference in its entirety.

BACKGROUND OF THE INVENTION

1. Field of the Invention

The present invention relates generally to placing and removing waterfowl decoys in a field and, more particularly, to providing a tubular receiving member that is set in the ground for loosely receiving a vertical stake used as a support for a motion or stationary waterfowl decoy. The vertical support stake on the waterfowl decoy, when placed into the tubular receiving member, allows the waterfowl decoy to twist and turn with the wind to provide a decoy having a realistic motion. At the end of the day when the hunt is finished, the waterfowl decoys can be lifted out of the tubular receiving member to protect the decoys from theft and avoid premature deterioration of the decoys due to dirt, frost, freezing rain, or snow until the next hunt when the decoys are quickly and easily positioned in the same formation or pattern by simply inserting the vertical stakes of the decoys in the previously positioned tubular receiving members. With this invention the support stakes on the waterfowl decoys are neither pushed into the ground or into holes in the ground that must be drilled when the ground is frozen.

2. Description of the Related Art

For years hunters have used various types of decoys to assist in harvesting waterfowl. A common type of waterfowl decoy used on land is called a waterfowl decoy displayed on a stake.

One example of a waterfowl decoy displayed on a stake is a typical motion waterfowl decoy, such as a goose decoy. This decoy is normally a shell decoy that has a rust resistant metal support stake with a standard washer welded to the stake approximately one inch from its top end. The decoy has an opening in its back that is just large enough in diameter to receive the support stake. To use the decoy, the support stake is partially driven into the ground, leaving approximately 14 inches, more or less, above the ground and the top of the stake is guided into an opening in the back of the decoy as the decoy is lowered into place. A standard washer is welded to the stake to prevent the decoy from sliding all the way down the stake and resting on the ground. The washer supports the decoy above the ground and allows about one inch of the support stake to protrude up and out of the back of the decoy. The loose attachment of the decoy to the stake allows the decoy, with the slightest wind present, to wobble and tilt with a lifelike motion.

The decoys used by a hunter can number as high as 200 units and are displayed in a variety of patterns to entice flying waterfowl to land in or near the decoy spread and blind. The decoy spread is placed near or around the hunter's blind where the hunter and possibly one or more hunting companions wait for their quarry. The decoys are usually placed in position (set up) well before shooting time, which is at sunrise, or earlier. Normally, the decoys are retrieved after the hunt is finished or at the end of the day, to prevent theft or disfigurement of the decoys from dirt, frost, ice, or snow. Care must be taken with the handling and use of decoys so as to not change their pristine, natural appearance. Mud or dirt from the field is probably the biggest contaminate. The more natural appearing the decoys remain, the more attracting qualities they display. The decoys are almost always used in harvested grain fields, or other fields that hold a food supply.

Stake mounted types of waterfowl decoys are usually deployed in low light and all kinds of weather conditions. Wind, rain, snow and freezing conditions make this type of motion decoy or any decoys that use a support stake difficult to use. For example, when the ground is frozen, holes must be pre-drilled or punched into the ground before the stake and decoy can be put in place. In addition, the placement of the decoys in low light conditions presents many problems. The stakes used for Canada geese are painted flat black to resemble waterfowl legs and have a red tape or paint marking at their top for identification. If a stake is placed in the ground without the decoy being attached or in position, on the top end of the stake, the decoy will then have to be placed onto the stake later. This process usually requires two hands to complete, and is best done by handling and placing only one decoy at a time onto a stake. This requires two steps which can be time consuming. The first step being the placement of the stakes into the ground and the second step being the placement of the decoy on the top of the stake. If the decoy is placed on the stake before the stake is inserted into the ground, two hands must be used to prevent the decoy from falling off the stake.

This method of inserting the stake into the ground while the decoy is on the stake can damage the area where the decoy meets the stake, especially when a hunter pushes or pounds on the decoy to push the stake into the ground when the ground is very firm or contains stones. In addition, when setting up decoys in the early morning when the lighting is poor, a desired spread pattern may not be achieved. Even with artificial lighting, it is difficult to see the whole decoy pattern. Thus, changes in the decoy pattern may have to be made after first light, or sunrise.

When setting up or retrieving decoys during rain, snow, or when the ground is wet or muddy, it is important that the decoys are not placed on the ground. When removing the decoy stakes, a clump of mud usually remains stuck to the supporting stake, and must be wiped or washed off in order to insure that contamination of the decoys does not take place during handling and storage. This task, when multiplied by the sheer number of decoys being used, can become very labor intensive.

During very cold conditions, the ground may be very firm or frozen and inhibit the use of supporting stakes. Die hard hunters will resort to drilling a support stake hole into the frozen ground with a drill or punching a hole into the ground in order to insert the supporting stake. After the hole is drilled or punched, the supporting stake must be inserted immediately before the hunter loses track of the location of the hole. During snowy, or frozen conditions, this task is almost impossible to accomplish. If no hole is pre-drilled or punched into the frozen ground, a metal stake may bend, and a plastic stake may break when insertion is attempted.

During severe wind conditions, the decoys may be blown off their stakes because they are not rigidly attached to their support stakes; they are only loosely coupled to the supporting stakes. If a decoy is blown off its stake, it will have to be repositioned on its stake in order to be effective, and may suffer from mud or other contamination upon falling on the ground.

SUMMARY OF THE INVENTION

It is the object of the invention to provide apparatus and method for quickly and easily positioning and removing motion or other waterfowl decoys that have a support stake, in various light and weather conditions.

It is another object of the invention to provide apparatus and method for using motion decoys or other waterfowl decoys that have a support stake that can be set up and removed without ever touching the ground or any other contaminate.

It is another object of the invention to provide apparatus and method for using motion decoys or other waterfowl decoys that strongly resist being blown off their stakes during very windy conditions.

It is a further object of the invention to provide apparatus and method for using motion decoys, or other waterfowl decoys that have a support stake that can be placed in a planned pattern regardless of weather and low light conditions.

It is a further object of the invention to provide apparatus and method for using motion or other waterfowl decoys that have a support stake where it is not necessary to place the support stake into the decoy every time the decoy is used.

It is another object of the invention to provide apparatus and method for using motion or other waterfowl decoys that have a support stake without having to insert and remove the support stakes from the ground every time the decoys are used.

It is a further object of the invention to provide apparatus and method for using motion or other waterfowl decoys that have a support stake that does not require extensive labor to set up and retrieve the decoys.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings.

DETAILED DESCRIPTION OF THE INVENTION

Figure 1:
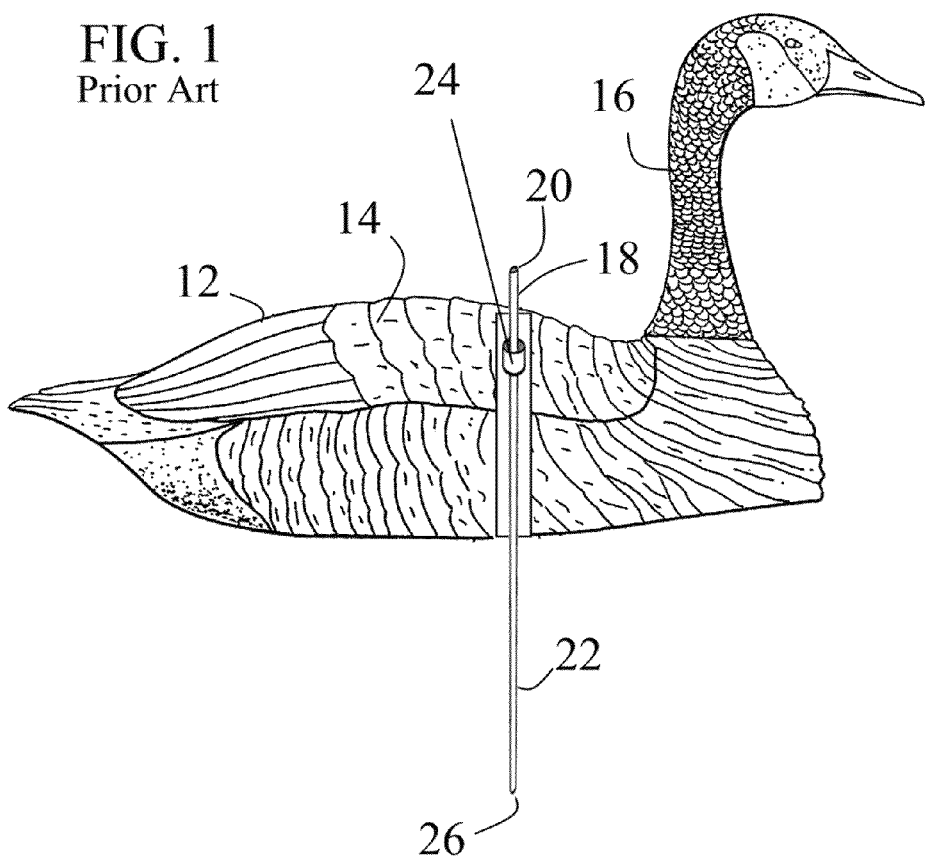
FIG. 1 is a partial sectional view of a prior art motion waterfowl decoy on a support stake.

Referring to FIG. 1, there is shown a partial sectional view of a prior art motion waterfowl shell decoy 14 on a support stake 22. The decoy is of a Canadian goose having a decoy body 12, a neck and head 16 and an opening 18 in its back for loosely receiving an end 20 of a support stake 22.

Figure 2:
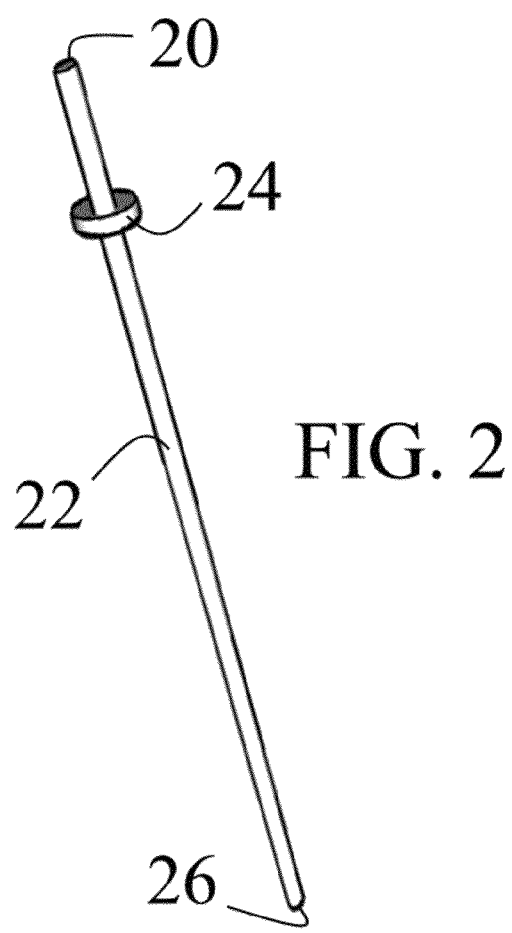
FIG. 2 is a side view of the prior art stake shown in FIG. 1.

The prior art motion waterfowl decoy shown in FIG. 1 is a Higdon motion shell decoy. This decoy comes with a ¼ inch black steel stake 22 with a washer 24 welded into place about 1½ inches from the top end 20 of the stake as shown in FIG. 2. To use this prior art decoy, a hunter pushes or pounds the bottom end 26 of the stake 22 into either soft or thawed ground and then places the motion shell decoy onto the top end 20 of the stake 22. A ¼ inch hole 18 is located in the back of the decoy for loosely receiving the top end 20 of the stake 22. The top end 20 of the stake goes into the decoy until the back of the decoy engages the top of the washer 24. The washer prevents the decoy from sliding down the stake onto the ground. At this time the decoy is balanced on the washer and stake and has motion. Because the decoy is coupled to the end of the stake by placing the end of the stake into the ¼inch opening in the back of the decoy where it is not easily seen, a hunter either has to get down on his/her knees, or move the decoy back and forth until the opening 18 in the back of the decoy is aligned with the end of the stake. In some instances the hunter may place the stake into the opening in the bottom of the decoy, and then by using two hands, one hand near the opening in the bottom of the decoy and the other hand on the top end of the stake, insert the decoy and stake into the ground at once. Clearly, the prior art motion decoys are almost impossible to set up in frozen conditions. For example, when the ground is frozen and a hunter drills a number of holes in the frozen ground for receiving the stakes, it may be difficult to locate each drilled hole in order to push the stake into it. In addition, the prior art motion decoys are subject to being blown off their stakes during high wind conditions, just when the geese like to fly.

Figure 3:
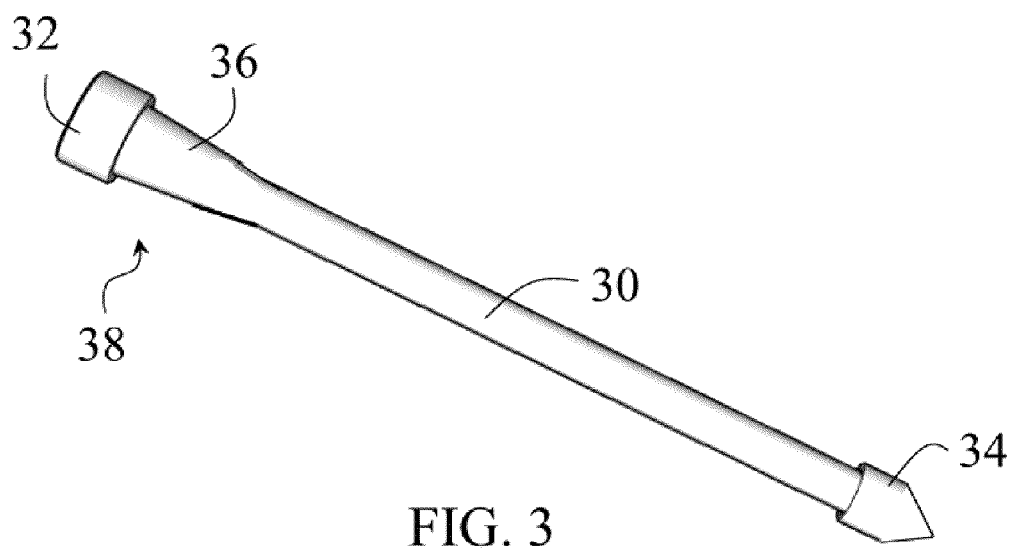
FIG. 3 is a side view of a tubular receiving member with a removable cap.

The present invention overcomes the deficiencies present in setting up prior art motion decoys. Referring to FIG. 3, there is shown a side view of a tubular receiving member 30 having a removable end cap 32 and a flared top end 36. The small bottom end has a cap 34 that is securely attached to the tubular receiving member 30. The tubular receiving member 30 functions as a holder for the support stake 22 of the motion or other waterfowl decoy. The tubular receiving member 30 has a length of about 18-20 inches more or less, is composed of ½ inch black extruded PVC conduit pipe, and has a flared end section 36 at the top end 38. Different lengths can be used dependent on which species are being attracted and the location of the receiving member. For instance, hunting in shallow water areas could require the receiving member to be several feet long. A cone, pyramid, or wedge shaped watertight cap 34 is glued in place on the bottom end of the tubular receiving member to facilitate placing the bottom end of member 30 into the ground. The removable cap at the top end of the tubular receiving member is provided to prevent water, snow, or other debris from entering the member. The tubular receiving member can be made of copper, brass, bronze, aluminum, plastic, PVC, PVC conduit, fiberglass or any other suitable material. In each instance, the tubular receiving member has an inside diameter that is sufficient to loosely receive, without binding, the support stake of the decoy. In addition, the surface of the tubular receiving member has a color or shade of black when the hunter is after Canadian geese, straw colored when the hunter is after white geese, and various other colors when after other waterfowl. In an embodiment, the tubular receiving member can have a permanent finish of black and a removable sleeve that is either a rigid tube or a fabric having a straw color that can be placed over the black tubular receiving member to allow the hunter to have the option of hunting either Canadian geese or White geese. End cap 32 can have a striking color such as orange or any other color which is flat, reflecting, or fluorescent to enable a hunter to quickly and easily locate the tubular receiving members when he/she is setting up a pattern of decoys.

The top end of the tubular receiving member is flared to have either an enlarged diameter or it can have a funnel shape.

The larger opening at the top end of the tubular receiving member is provided to facilitate placing the support stake of the decoy into the tubular receiving member. Decoys with support stakes encased in a tubular receiving member can be placed in their entirety into the invention.

Figure 4:
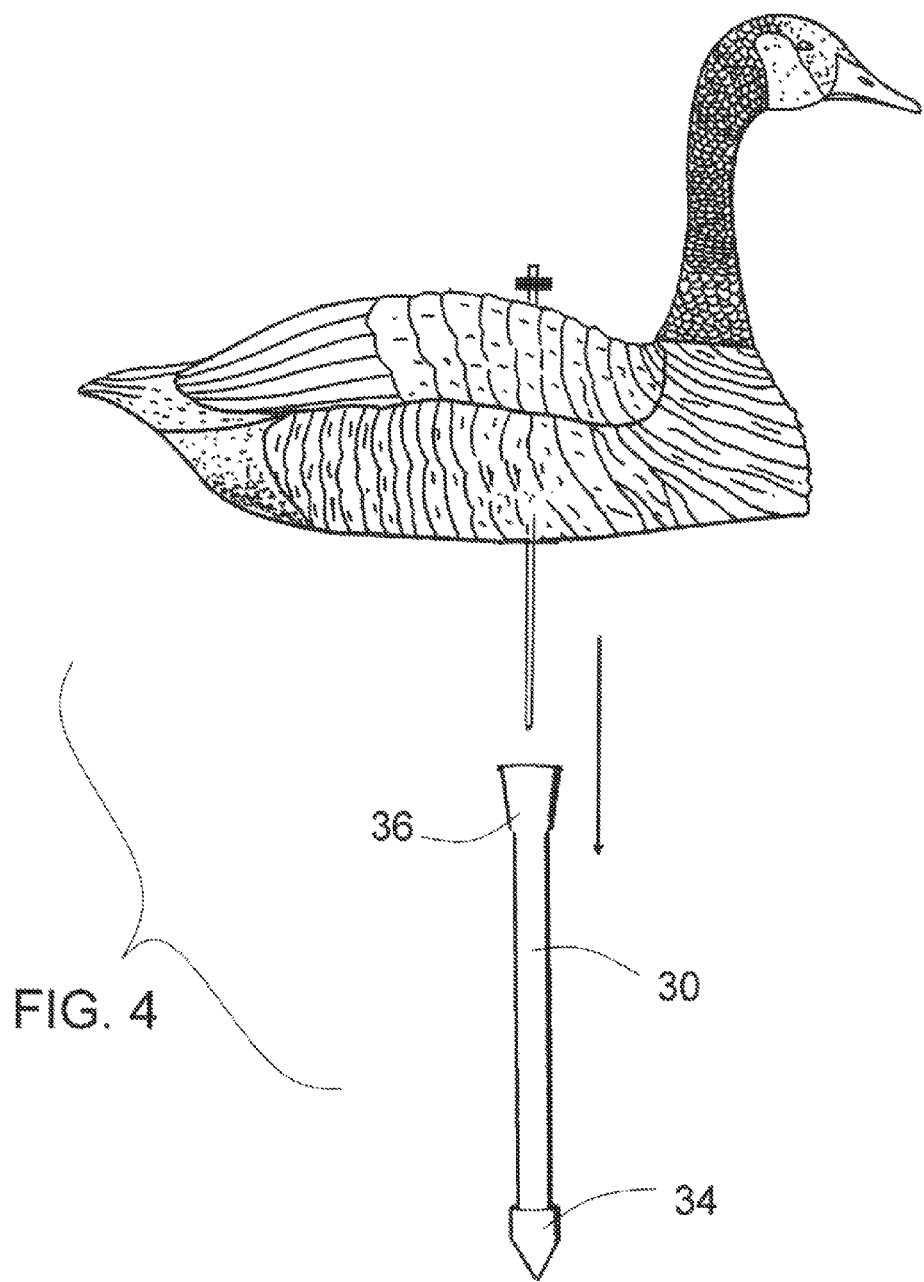
FIG. 4 is a view of a motion waterfowl decoy being set up by placing the support stake of the motion waterfowl decoy into the tubular receiving member.

Referring to FIG. 4, when the invention herein disclosed is being used for the first time in the hunting season, the hunter removes the top removable end cap and or lightly pounds on the top end of the tubular receiving member to force the conical or wedge shaped end of the tubular receiving member into the ground, leaving about 14 inches of the tubular receiving member protruding up from the ground. The hunter then replaces the top removable end cap until they are ready to use the tubular receiving member. Normally the hunter will push a number of tubular receiving members into the ground in this fashion to form a suitable pattern. At least one tubular receiving member will be used for each decoy. However, in order to vary the pattern of the decoys, more tubular receiving members than decoys can be used. This is usually done before the waterfowl season begins and when conditions are favorable such as when the ground is soft and the farmer has finished working the field. The top removable caps are removed when the tubular receiving members are to be used and are replaced when not in use. Under normal conditions, the tubular receiving members are left in the ground until the hunting season ends. The removable caps prevent the tubular receiving members from filling with water or other debris during rain or snow conditions.

After the tubular receiving members have been placed in the ground the hunter is ready to hunt geese. When the hunter wants to deploy the decoys, he/she first removes all of the removable caps from the tubular receiving members that have previously been driven into the ground. The hunter then carries several decoys to the tubular receiving members at one time and, with one hand, merely drops each support stake with the motion or other waterfowl decoy attached, into the top opening of each tubular receiving member to quickly and easily position the various decoys (See FIG. 4). When the hunt is completed, the hunter removes the decoys and replaces the removable caps on the ends of the tubular receiving members and leaves for home until the next hunt. The removal and replacement of the exposed end caps is relatively easy as the caps are on top of the tubular receiving members which are approximately 14 inches above the ground.

With this invention the motion decoys can be quickly and easily set up and retrieved in any light or weather conditions with almost no possibility that the decoys and their attached stakes will be contaminated by touching the ground. The black tubular receiving members are easily visible in rainy, snowy or low light conditions as they protrude well above the ground and are of sufficient diameter to be easily seen. The decoys may never come in contact with the ground or other contaminates and the decoy support stakes are never inserted directly into or removed from the ground. Thus, it is not necessary to remove mud or other contaminates from the decoys or their stakes. The decoys can be deployed in snowy conditions as the ends of the tubular receiving members are well above the ground and are visible in over one foot of snow. The height of the tubular receiving members eliminates the need for extensive bending over by the hunter when setting up and retrieving the decoys, and setting up is simple in frozen conditions because holes do not have to be drilled in the ground for the stakes. High winds will not dislodge the decoys from their position, as the push nuts or other methods of attachment hold the decoys in place on the stakes.

The invention can be used with any motion or other waterfowl decoy that requires the decoy to be supported by a stake. Decoys that have a supporting stake encased in a sleeve may be used with the invention by placing the entire stake and sleeve into the invention.

Based upon the foregoing, it will be apparent that there has been provided a new and useful apparatus and method for setting up and retrieving waterfowl motion or stationary decoys that have a support stake.

While there have been shown and described and pointed out the fundamental novel features of the invention as applied to the preferred embodiments, it will be understood that various omissions and substitutions and changes of the form and details of the apparatus illustrated and in the operation may be done by those skilled in the art, without departing from the spirit of the invention.

What is claimed is:

1. A combination of a decoy and an apparatus to support the decoy for attracting waterfowl, comprising:
   a decoy including:
      a neck portion, a head portion, a body portion, and a stake protruding from the body portion of the decoy; and
   an apparatus supporting said decoy including:
      a tubular receiving member having an internal channel for receiving said stake, an upper end that is flared to provide an opening that is larger than the internal channel in the tubular receiving member; and a lower end that is sealed to prevent water from entering the tubular receiving member; and
      a removable upper end cap to cover the upper end to prevent water from entering the tubular receiving member when the tubular receiving member is in place in a field but the stake of the decoy is not located in the tubular receiving member;
      wherein the lower end of the tubular receiving member is adapted to be mounted in the ground.

2. The combination of a decoy and an apparatus to support the decoy of claim 1, further comprising: an end cap which is attached to the lower end of the tubular receiving member having a pointed end to facilitate insertion of the lower end of the tubular receiving member into the ground.

3. The combination of a decoy and an apparatus to support the decoy of claim 1, wherein the lower end of the tubular receiving member is pointed to facilitate the insertion of the lower end into the ground.

* * * * *